United States Patent
Li

(10) Patent No.: US 11,757,268 B2
(45) Date of Patent: Sep. 12, 2023

(54) CABLE PRESSING STRUCTURE AND LAMP

(71) Applicants: SUZHOU OPPLE LIGHTING CO., LTD., Suzhou (CN); OPPLE LIGHTING CO., LTD., Shanghai (CN)

(72) Inventor: Bin Li, Shanghai (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 81 days.

(21) Appl. No.: 17/361,603

(22) Filed: Jun. 29, 2021

(65) Prior Publication Data
US 2021/0408772 A1   Dec. 30, 2021

(51) Int. Cl.
*F16L 3/06* (2006.01)
*F21V 17/10* (2006.01)
*H02G 3/06* (2006.01)

(52) U.S. Cl.
CPC ............. *H02G 3/0666* (2013.01); *F16L 3/06* (2013.01); *F21V 17/10* (2013.01)

(58) Field of Classification Search
CPC ........... H02G 3/0666; F16L 3/06; F21V 17/10
USPC ........................................... 174/68.1
See application file for complete search history.

(56) References Cited

U.S. PATENT DOCUMENTS

| | | | | | |
|---|---|---|---|---|---|
| 4,653,829 | A | * | 3/1987 | LaMont | H01R 33/22 439/409 |
| 5,421,742 | A | * | 6/1995 | Huang | H01R 33/22 439/419 |
| 5,702,267 | A | * | 12/1997 | Chen | F21V 21/002 439/340 |
| 5,759,062 | A | * | 6/1998 | Chen | F21V 21/002 439/280 |
| 2012/0268955 | A1 | * | 10/2012 | Chen | H01R 33/962 362/394 |
| 2016/0076671 | A1 | * | 3/2016 | Lawrence | F16L 3/06 248/74.5 |
| 2016/0076743 | A1 | * | 3/2016 | Deutsch | F21V 7/0091 362/268 |

FOREIGN PATENT DOCUMENTS

CN   206176284   *   5/2017

* cited by examiner

*Primary Examiner* — Timothy J Thompson
*Assistant Examiner* — Michael F McAllister
(74) *Attorney, Agent, or Firm* — Arch & Lake LLP

(57) ABSTRACT

The present disclosure discloses a cable pressing structure and a lamp. The cable pressing structure adapted to fix a cable on a carrying base, includes: a main portion and a first connecting portion and a second connecting portion provided at both ends of the main portion, respectively. The cable pressing structure is configured to being detachably connected to the carrying base through the first connecting portion and the second connecting portion, and press and fix the cable on the carrying base; the main portion has a first side surface and a second side surface facing away from each other, a first cable pressing portion is provided on the first side surface, and a second cable pressing portion is provided on the second side surface. The cable pressing structure has a first installation state and a second installation state.

15 Claims, 6 Drawing Sheets

CABLE PRESSING STRUCTURE AND LAMP

CROSS-REFERENCE TO RELATED APPLICATIONS

This application claims the priority of the Chinese patent application No. 202021224951.4 filed on Jun. 29, 2020, the entire content of which is hereby incorporated by reference herein for all purposes.

TECHNICAL FIELD

The present disclosure relates to the field of cable installation technology, and in particular, to a cable pressing structure and a lamp.

BACKGROUND

Some electrical appliances are connected with many cables, and when the cables are pulled, the problem of looseness or even complete detachment is likely to occur. Therefore, the cables usually need to be fixed by a pressing block. Sometimes, since the size specification of the pressing surface of the pressing block is determined, and limited by this, a pressing block can only be installed corresponding to a cable of one thickness specification. Therefore, the pressing block has the problem of poor versatility.

SUMMARY

The present disclosure discloses a cable pressing structure, a lamp and a method of manufacturing a cable pressing structure.

On the one hand, the present disclosure provides a cable pressing structure that is adapted to fix a cable on a carrying base. The cable pressing structure may include: a main portion and a first connecting portion and a second connecting portion respectively provided at both ends of the main portion, the cable pressing structure is configured to be detachably connected to the carrying base through the first connecting portion and the second connecting portion, and press and fix the cable on the carrying base.

The main portion may have a first side surface and a second side surface facing away from each other, a first cable pressing portion may be provided on the first side surface, and a second cable pressing portion may be provided on the second side surface.

The cable pressing structure may have a first installation state and a second installation state, where, in the first installation state, the first cable pressing portion may face the carrying base and may form a first cable pressing space with the carrying base; in the second installation state, the second cable pressing portion may face the carrying base and may form a second cable pressing space with the carrying base, a size of the first cable pressing space and a size of the second cable pressing space may not be equal.

On the other hand, the present disclosure provides a lamp. The lamp may include a carrying base and a cable pressing structure that is adapted to fix a cable on a carrying base. The cable pressing structure may include: a main portion and a first connecting portion and a second connecting portion respectively provided at both ends of the main portion, the cable pressing structure is configured to be detachably connected to the carrying base through the first connecting portion and the second connecting portion, and press and fix the cable on the carrying base.

The main portion may have a first side surface and a second side surface facing away from each other, a first cable pressing portion may be provided on the first side surface, and a second cable pressing portion may be provided on the second side surface.

The cable pressing structure may have a first installation state and a second installation state, where, in the first installation state, the first cable pressing portion may face the carrying base and may form a first cable pressing space with the carrying base; in the second installation state, the second cable pressing portion may face the carrying base and may form a second cable pressing space with the carrying base, a size of the first cable pressing space and a size of the second cable pressing space may not be equal.

The present disclosure provides a method of manufacturing a cable pressing structure that is adapted to fix a cable on a carrying base. The method may include providing a main portion; and providing a first connecting portion and a second connecting portion at both ends of the main portion; configuring the cable pressing structure to be detachably connected to the carrying base through the first connecting portion and the second connecting portion, and pressing and fixing the cable on the carrying base; providing the main portion with a first side surface and a second side surface facing away from each other, providing a first cable pressing portion on the first side surface, and providing a second cable pressing portion is provided on the second side surface; providing the cable pressing structure with a first installation state and a second installation state, where, in the first installation state, the first cable pressing portion may face the carrying base and may form a first cable pressing space with the carrying base; in the second installation state, the second cable pressing portion may face the carrying base and may form a second cable pressing space with the carrying base, a size of the first cable pressing space and a size of the second cable pressing space may not be equal.

It is to be understood that both the foregoing general description and the following detailed description are exemplary and explanatory only and are not restrictive of the present disclosure.

BRIEF DESCRIPTION OF THE DRAWINGS

The drawings described here are used to provide a further understanding of the present disclosure and constitute a part of the present disclosure. The examples and their descriptions are used to explain the present disclosure and do not constitute an improper limitation of the present disclosure. In the drawings.

DETAILED DESCRIPTION

Figure 1:
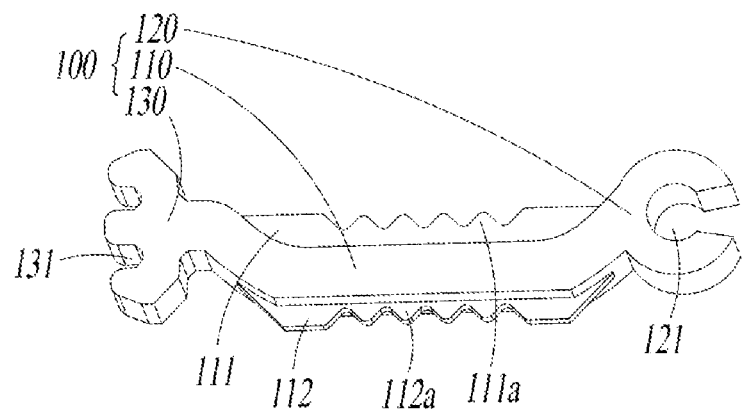
FIG. 1 is a schematic diagram of a first cable pressing structure according to examples of the present disclosure.
Figure 2:
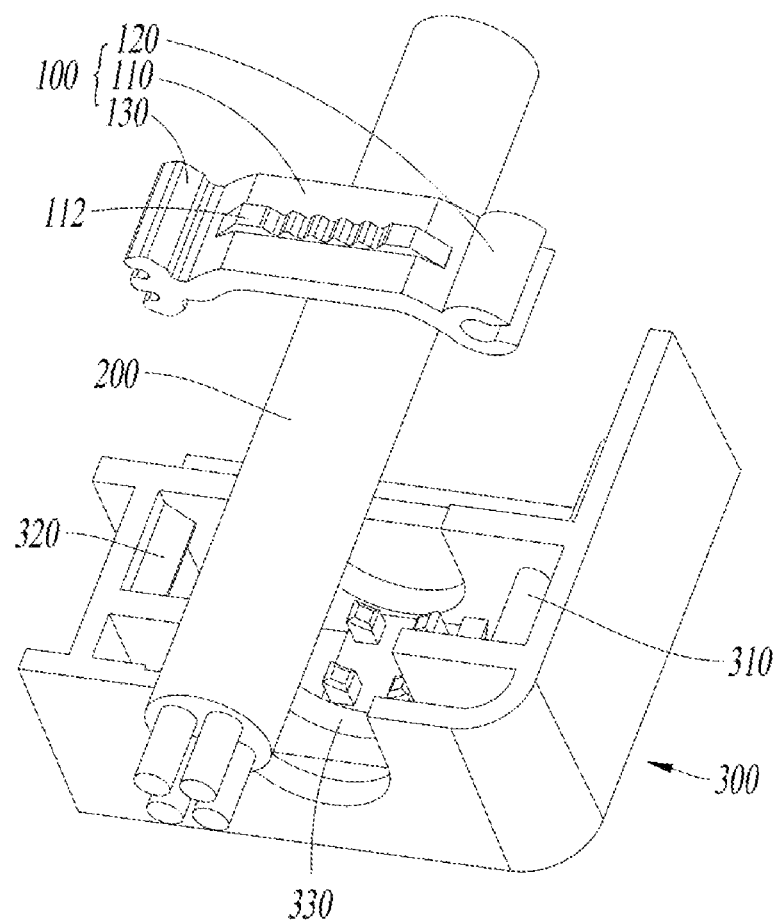
FIG. 2 is a schematic diagram of working principle of the first cable pressing structure pressing the cable through a first cable pressing portion according to examples of the present disclosure.

In order to make the object, technical solution and advantages of the present disclosure clearer, the technical solution of the present disclosure will be clearly and completely described below in combination with examples of the present disclosure and the corresponding drawings. The described examples are only a part of examples of the present disclosure, rather than all examples of the present disclosure. Based on examples of the present disclosure, all other examples obtained by those of ordinary skill in the art without creative work will fall within the protection scope of the present disclosure.

Reference numerals of the present disclosure may include:

100—cable pressing structure; 110—main portion; 111—first cable pressing portion; 111a—first tooth; 112—second cable pressing portion; 112a—second tooth; 120—first connecting portion; 121—first mounting hole; 122—third mounting hole; 130—second connecting portion; 131—snap groove; 132—second mounting hole; 133—fourth mounting hole; 200—cable; 300—carrying base; 310—supporting link; 320—third tooth; 330—cable-passing groove.

Refer to FIG. 1 to FIG. 11, an example of the present disclosure discloses a cable pressing structure 100, and the cable pressing structure 100 disclosed is suitable for fixing a cable 200 on a carrying base 300. In the example, the cable pressing structure 100 can press and fix the cable of a lamp and install the cable on the carrying base 300. The type of the carrying base 300 can be various, such as wall, lamp housing, and transfer structure of lamp, etc., and the specific type of the carrying base 300 is not limited in the example.

In the example, the cable pressing structure 100 includes a main portion 110 and a first connecting portion 120 and a second connecting portion 130 respectively provided at both ends of the main portion 110. The cable pressing structure 100 is detachably connected to the carrying base 300 through the first connecting portion 120 and the second connecting portion 130, and the cable pressing structure 100 press and fix the cable 200 on the carrying base 300. It should be understood that, the first connecting portion 120 and the second connecting portion 130 are the connecting structures of the cable pressing structure 100, and the detachable connection relationship between the cable pressing structure 100 and the carrying base 300 can be realized by the first connecting portion 120 and the second connecting portion 130.

During installation, the cable 200 is located between the main portion 110 and the carrying base 300, and the first connecting portion 120 and the second connecting portion 130 are fixedly connected to the carrying base 300. The main portion 110 have a tendency to move close to the carrying base 300 along with the first connecting portion 120 and the second connecting portion 130; therefore, the main portion 110 and the cable 200 are in a state of pressing against each other. In case that the main portion 110 has a certain elastic deformation, the main portion 110 can press and fix the cable 200 on the carrying base 300.

During disassembly, at least one of the first connecting portion 120 and the second connecting portion 130 can be disconnected from the carrying base 300, at this time, the main portion 110 does not press and fix the cable 200, and the cable 200 is not in a location constraint state, so that the cable 200 can be detached from between the main portion 110 and the carrying base 300.

The main portion 110 has a first side surface and a second side surface facing away from each other, a first cable pressing portion 111 is provided on the first side surface, and a second cable pressing portion 112 is provided on the second side surface. With this arrangement, the first cable pressing portion 111 and the second cable pressing portion 112 are also away from each other, so the structural layout of the first cable pressing portion 111 and the second cable pressing portion 112 will not be affected by each other. During specific application process, the cable 200 can be pressed and fixed on the carrying base 300 by the first cable pressing portion 111 on the first side surface, or the cable 200 can be pressed and fixed on the carrying base 300 by the second cable pressing portion 112 on the second side surface.

Furthermore, the cable pressing structure 100 has a first installation state and a second installation state, that is, the cable pressing structure 100 can press and fix the cable 200 in the first installation state or the second installation state.

In the first installation state, the first cable pressing portion 111 faces the carrying base 300 and forms a first cable pressing space with the carrying base 300. Specifically, in the first installation state, the main portion 110 is turned over so that the first side surface faces the carrying base 300, and the main portion 110 is pressed against the cable 200 by the first cable pressing portion 111, at this time, the cable 200 is in the first cable pressing space. Combined with the foregoing, the first connecting portion 120 and the second connecting portion 130 are fixedly connected to the carrying base 300, thereby completing the installation process of the cable pressing structure 100 pressing and fixing the cable 200 by the first cable pressing portion 111 on the first side surface.

In the second installation state, the second cable pressing portion 112 faces the carrying base 300 and forms a second cable pressing space with the carrying base 300. Specifically, in the second installation state, the main portion 110 is turned over so that the second side surface faces the carrying base 300, and the main portion 110 is pressed against the cable 200 by the second cable pressing portion 112, at this time, the cable 200 is in the second cable pressing space. Combined with the foregoing, the first connecting portion 120 and the second connecting portion 130 are fixedly connected to the carrying base 300, thereby completing the installation process of the cable pressing structure 100 pressing and fixing the cable 200 by the second cable pressing portion 112 on the second side surface.

In the example, the size of the first cable pressing space and the second cable pressing are not equal. It should be understood that, with this arrangement, the size of the accommodating space in the first cable pressing space and the accommodating space in the second cable pressing space are not equal, so the first cable pressing space and the second cable pressing space can accommodate cables 200 of different thickness specifications, thereby enhancing the versatility of the cable pressing structure 100.

It can be seen from the above content that, in the cable pressing structure 100 according to the examples of the present disclosure, the cable pressing structure 100 can be in the first installation state, and the first cable pressing portion 111 faces the carrying base 300 and forms the first cable pressing space with the carrying base 300. In this case, a cable 200 of one thickness specification can be pressed and fixed in the first cable pressing space. Furthermore, the cable pressing structure 100 can also be in the second installation state, and the second cable pressing portion 112 faces the carrying base 300, and forms the second cable pressing space with the carrying base 300. Since the size of the second cable pressing space and the first cable pressing space are not equal, a cable 200 of another thickness specification can be pressed and fixed in the second cable pressing space.

Therefore, the cable pressing structure 100 according to the examples of the present disclosure can be applied to the fixed installation operation of cables of at least two thickness specifications, and it undoubtedly has better versatility.

In the example, the main portion 110 can have various shapes. For example, the main portion 110 has a straight line shape. In this case, the first connecting portion 120 and the second connecting portion 130 may be arranged close to the first side surface, and a first cable pressing space with a larger internal accommodating space is formed on the side of the first side surface, and a second cable pressing space with a smaller internal accommodating space is formed on the second side surface facing away from the first side surface.

As shown in FIG. 1, in another example, the main portion 110 may be arched, the concave surface of the main portion 110 is the first side surface, the first cable pressing portion 111 is provided on the concave surface, and the convex surface of the main portion 110 is the second side surface, the second cable pressing portion 112 is provided on the convex surface. It should be understood that, in the arched structure, the concave surface can form a larger accommodating space compared with the convex surface. Therefore, since the first cable pressing portion 111 is provided on the concave surface and the second cable pressing portion 112 is provided on the convex surface, the size of the first cable pressing space formed between the first cable pressing portion 111 and the carrying base 300 is inevitably different from the size of the second cable pressing space formed between the second cable pressing portion 112 and the carrying base 300. Specifically, the accommodating space of the first cable pressing space is larger than that of the second cable pressing space, that is, a cable 200 with a larger diameter can be pressed and fixed by the first cable pressing portion 111, and a cable 200 with a smaller diameter can be pressed and fixed by the second cable pressing portion 112.

Since the cable 200 may be pulled during the use of the lamp, even if the cable 200 is pressed and fixed by the main portion 110, the cable 200 may move relative to the main portion 110 and be misaligned with the main portion 110.

Based on this, in an optional solution, at least a partial area of the first cable pressing portion 111 may be provided with a first tooth 111a, and at least a partial area of the second cable pressing portion 112 may be provided with a second tooth 112a.

With this arrangement, when the first cable pressing portion 111 is pressed against the cable 200, the first teeth 111a can be clamped on the surface of the cable 200, and the friction between the first cable pressing portion 111 and the cable 200 will undoubtedly be increased, therefore, the first cable pressing portion 111 can press and fix the cable 200 stably. In the same way, when the second cable pressing portion 112 is pressed against the cable 200, the second tooth 112a can be clamped on the surface of the cable 200, and the friction between the second cable pressing portion 112 and the cable 200 will undoubtedly be increased, therefore, the second cable pressing portion 112 can press and fix the cable 200 stably.

In summary, whether using the first cable pressing portion 111 or the second cable pressing portion 112, the cable pressing structure 100 can exert a more stable and reliable pressing and fixing effect on the cable 200, thereby preventing the cable 200 from moving relative to the main portion 110, so that even if the cable 200 is pulled, there will be no loosening or detachment problems.

As described above, the cable pressing structure 100 is detachably connected to the carrying base 300 through the first connecting portion 120 and the second connecting portion 130. But in the example, the specific type of the first connecting portion 120 and the second connecting portion 130 can be various.

As shown in FIG. 1 to FIG. 6, in an example, the cable pressing structure 100 can be rotatably fitted with the carrying base 300 through the first connecting portion 120, and the second connecting portion 130 is moved closer to the carrying base 300 or away from the carrying base 300 along with the rotation of the cable pressing structure 100. Specifically, since the first connecting portion 120 is located at one end of the main portion 110, the first connecting portion 120 serves as a pivot point when the cable pressing structure 100 rotates, and the second connecting portion 130 will rotate around the first connecting portion 120. In this case, the second connecting portion 130 can move closer to or away from the carrying base 300.

During installation, after the cable pressing structure 100 is firstly assembled with the carrying base 300 through the first connecting portion 120 in a rotation fitting manner, the cable 200 can be placed between the main portion 110 and the carrying base 300, and then the cable pressing structure 100 can be rotated so that the second connecting portion 130 rotates in a direction close to the carrying base 300. During this process, the main portion 110 gradually presses against the cable 200 and exerts a pressing and fixing effect on the cable 200 until the cable pressing structure is finally fixed to the carrying base 300 through the second connecting part 130, and thus the installation of the cable 200 is completed.

During disassembly, the connection relationship between the second connecting portion 130 and the carrying base 300 is firstly released, and then the cable pressing structure 100 can be rotated so that the second connecting portion 130 rotates in a direction away from the carrying base 300. During this process, the pressing effect of the main portion 110 on the cable 200 will gradually weaken until it disappears, and finally the cable 200 can be taken out from the side of the second connecting part 130, and thus the detachment of the cable 200 is completed.

Certainly, in the example, the rotational fitting relationship between the first connecting portion 120 and the carrying base 300 can be various. For example, a rotating shaft is provided on the first connecting portion 120, the rotating shaft can be embedded in the carrying base 300 and the rotating shaft can be rotatably fitted with the carrying base 300, so that the cable pressing structure 100 can rotate relative to the carrying base 300.

In another example, the first connecting portion 120 is provided with a first mounting hole 121, the carrying base 300 is provided with a supporting link 310, and the first connecting portion 120 is sleeved on the supporting link 310 through the first mounting hole 121. It should be understood that, with this arrangement, the first connecting portion 120 can rotate relative to the supporting link 310, thereby driving the entire cable pressing structure 100 to rotate relative to the carrying base 300.

In order to improve the installation convenience of the first connecting portion 120 and the carrying base 300, the first connecting portion 120 may be provided with a notch, and the notch is communicated with the first mounting hole 121. During specific installation, the supporting link 310 can enter the first mounting hole 121 through the notch, in this way, the supporting link 310 is assembled in a radial direction of the first mounting hole 121, avoiding the long distance installation that the supporting link 310 is assembled in an axial direction of the first mounting hole 121. The example does not limit the specific installation manner of the first connecting portion 120 and the carrying base 300. The supporting link 310 can also be assembled directly in the axial direction of the first mounting hole 121, that is, the supporting link 310 is directly inserted into the first mounting hole 121.

Furthermore, one of the second connecting portion 130 and the carrying base 300 is provided with a first limiting portion, and the other is provided with a plurality of second limiting portions. The first limiting portion can be snap-fitted to one of the second limiting portions, and the size of the accommodating space between the main portion 110 and the carrying base 300 changes as the first limiting portion is snap-fitted to different second limiting portions among the plurality of second limiting portions.

It should be understood that, since the first connecting portion 120 and the carrying base 300 are in a rotational fit relationship, the rotation of the cable pressing structure 100 relative to the carrying base 300 can be realized by the first connecting portion 120, and the installation position of the second connecting portion 130 can be changed during the rotation process. Moreover, in different installation positions, the first limiting portion can be snap-fitted with different second limiting portions, to realize the connection between the second connecting portion 130 and the carrying base 300. Since the accommodating space between the main portion 110 and the carrying base 300 changes as the first limiting portion is snap-fitted to different second limiting portions, the degree of compression of the main portion 110 on the cable 200 can be adjusted.

Figure 3:
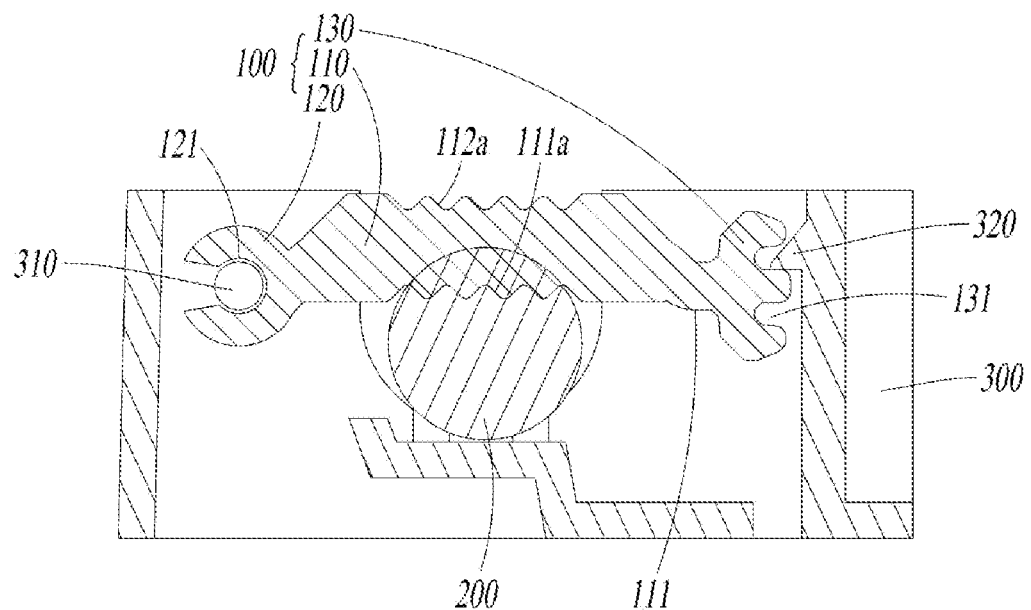
FIG. 3 is a cross-sectional view of the first cable pressing structure pressing the cable through the first cable pressing portion according to examples of the present disclosure.
Figure 4:
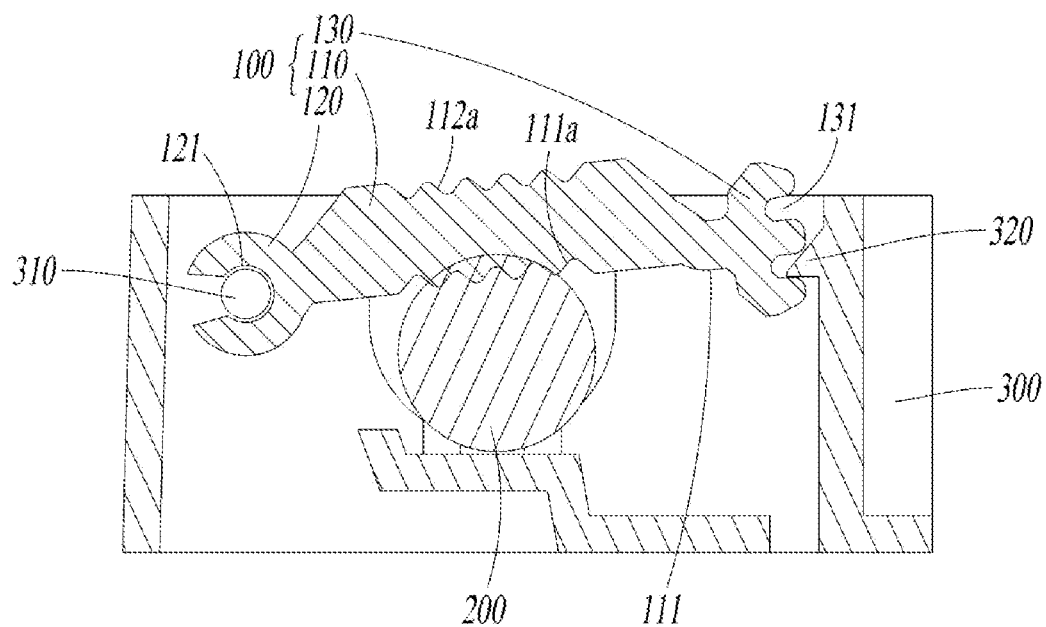
FIG. 4 is another cross-sectional view of the first cable pressing structure pressing the cable through the first cable pressing portion according to examples of the present disclosure.
Figure 5:
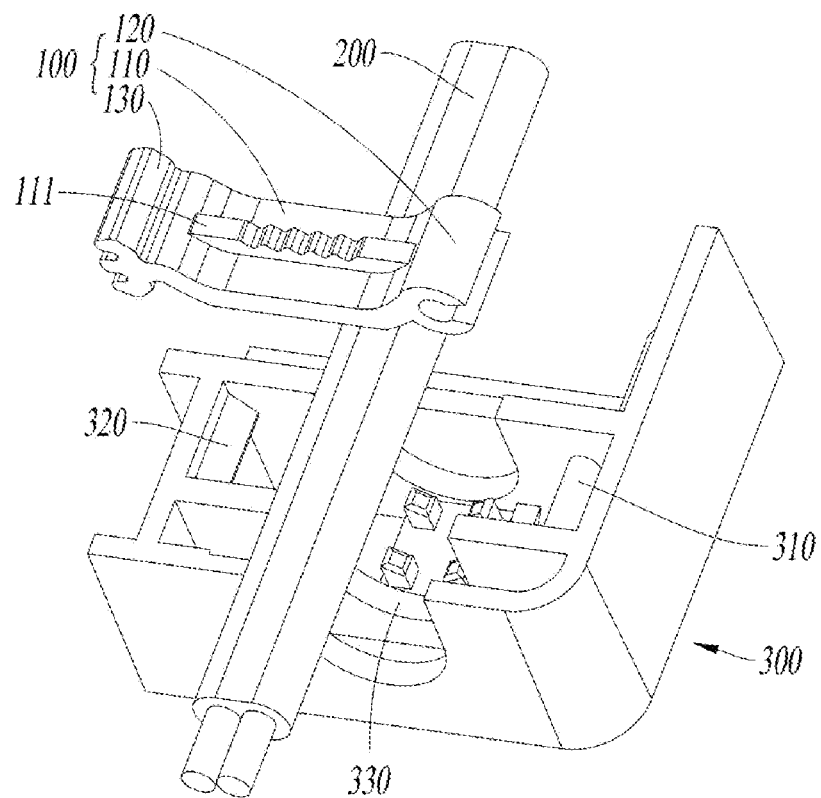
FIG. 5 is a schematic diagram of working principle of the first cable pressing structure pressing the cable through a second cable pressing portion according to examples of the present disclosure.
Figure 6:
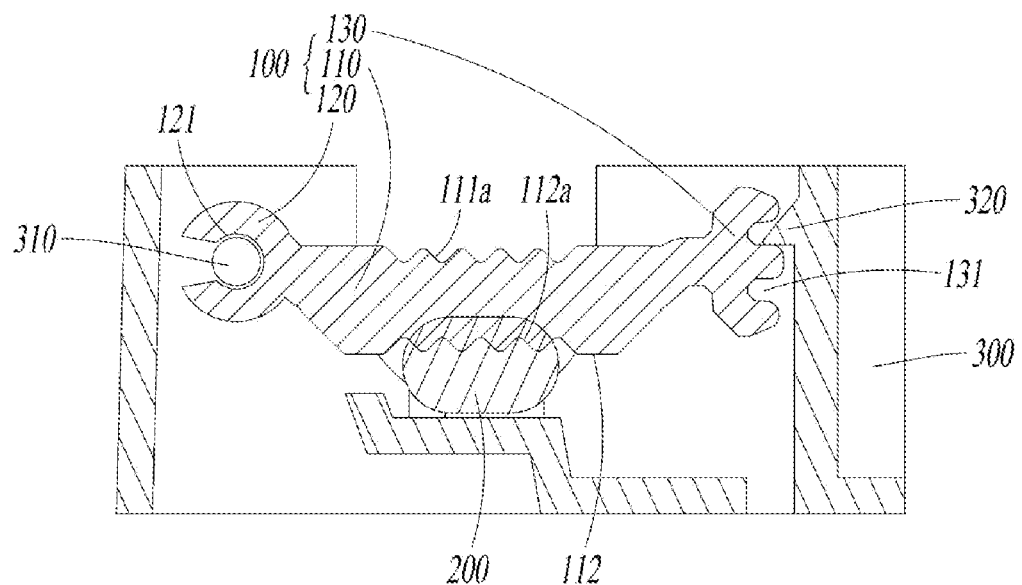
FIG. 6 is a cross-sectional view of the first cable pressing structure pressing the cable through the second cable pressing portion according to examples of the present disclosure.

Generally, the size of the accommodating space of the first cable pressing space and the second cable pressing space is quite different, therefore, for cables 200 with obvious differences in thickness specification, it is necessary to select a cable pressing space adapted to the cable 200 from the first cable pressing space or the second cable pressing space, for example, the cables 200 with obvious differences in thickness specification include two-core cables and four-core cables. Then, the degree of compression of the main portion 110 on the cable 200 may be checked to fine-tune the cable pressing structure 100. Specifically, as shown in FIGS. 3 and 4, if the main portion 110 presses the cable 200 too loosely, the first limiting portion can be adjusted to be snap-fitted to another second limiting portion, so that the second connecting portion 130 moves closer to the carrying base 300, thereby improving the compression effect of the main portion 110 on the cable 200. If the main portion 110 presses the cable 200 too tightly, the first limiting portion can be adjusted to be snap-fitted to another second limiting portion, so that the second connecting portion 130 moves away from the carrying base 300, thereby reducing the compression effect of the main portion 110 on the cable 200.

In the example, the structure types of the first limiting portion and the second limiting portion are various. For example, the first limiting portion may be a block provided on the first connecting portion 120, and the second limiting portion may be a plurality of snap grooves provided on the carrying base 300, and the block can be snapped into different snap grooves, so as to change the size of the accommodating space between the main portion 110 and the carrying base 300.

In another example, the second connecting portion 130 is provided with a plurality of snap grooves 131 arranged along the height direction of the cable pressing structure 100, and a third tooth 320 adapted to the snap grooves 131 is provided on the carrying base 300, and the third tooth 320 can be snap-fitted to one of the snap grooves. With this arrangement, the cable pressing structure 100 rotates relative to the carrying base 300 through the first connecting portion 120, so that different snap grooves 131 can be snap-fitted to the third teeth 320, since the snap grooves 131 are arranged in the height direction of the cable pressing structure 100, the size of the accommodating space between the main portion 110 and the carrying base 300 will also change accordingly, so as to adjust the degree of compression of the cable 200 by the main portion 110.

Figure 7:
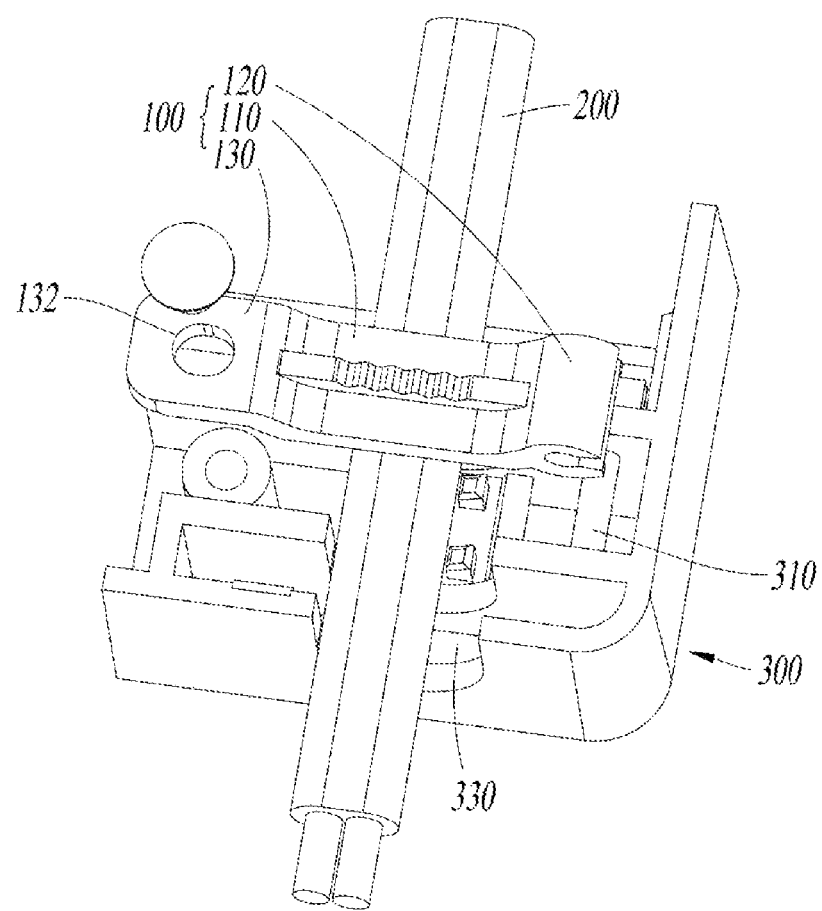
FIG. 7 is a schematic diagram of working principle of a second cable pressing structure pressing the cable through a second cable pressing portion according to examples of the present disclosure.
Figure 8:
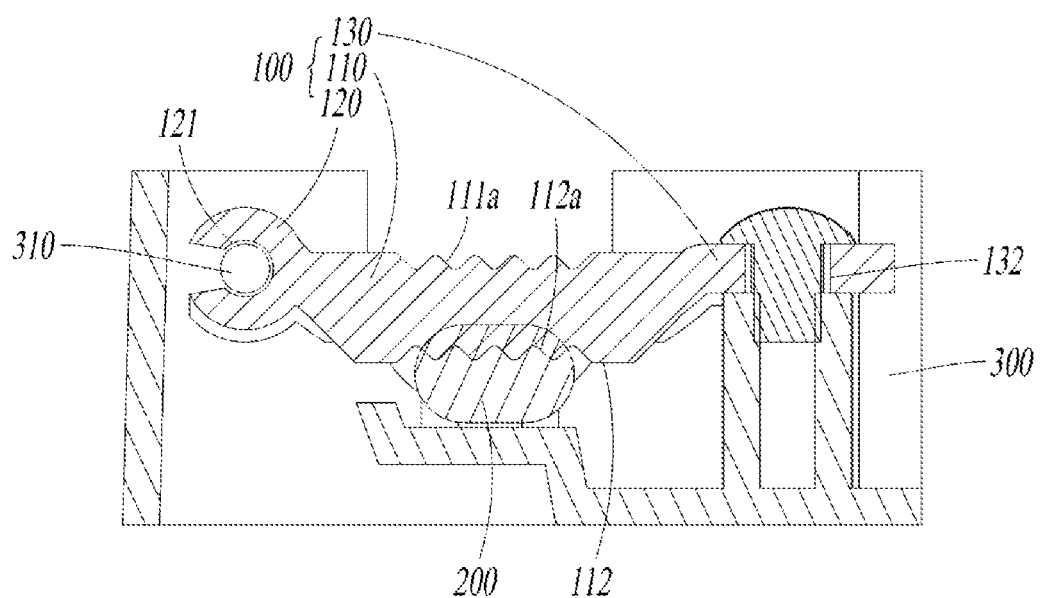
FIG. 8 is a cross-sectional view of the second cable pressing structure pressing the cable through the second cable pressing portion according to examples of the present disclosure.
Figure 9:
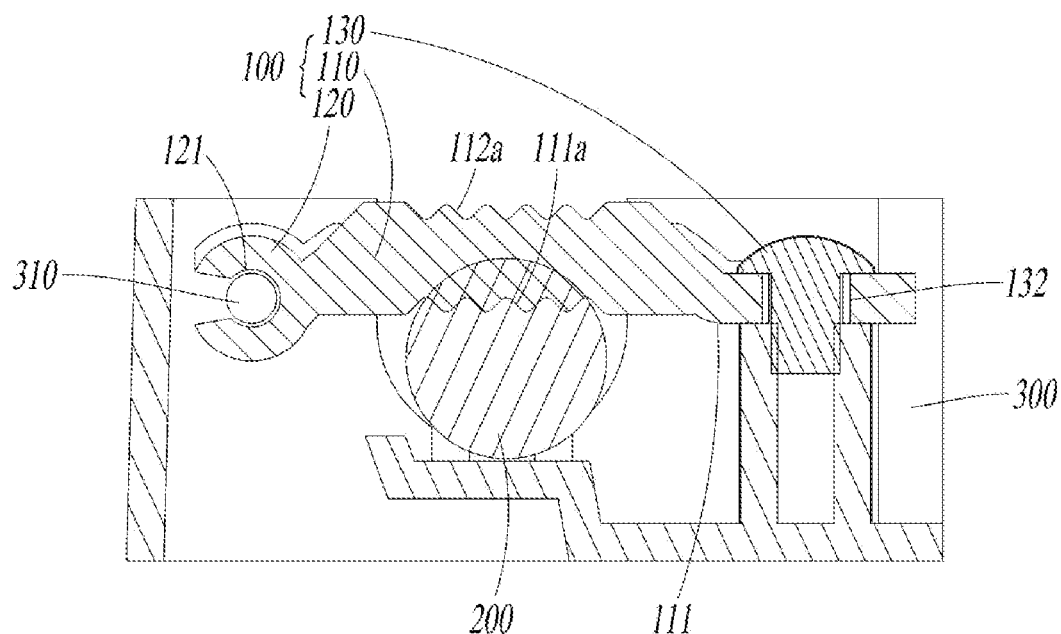
FIG. 9 is a cross-sectional view of the second cable pressing structure pressing the cable through a first cable pressing portion according to examples of the present disclosure.

Certainly, as described above, the second connecting portion 130 is detachably connected to the carrying base 300, and the second connecting portion 130 can also be connected to the carrying base 300 through other fitting manners besides snap-fitting. As shown in FIG. 7 to FIG. 9, in an alternative solution, the second connecting portion 130 may be provided with a second mounting hole 132, and the cable pressing structure 100 can be detachably connected to the carrying base 300 through the cooperation of the second mounting hole 132 and a threaded fastener, and thus the cable pressing structure 100 can be detachably connected to the carrying base 300.

During specific installation process, the threaded fastener passes through the second mounting hole 132 and is threadedly fitted with the threaded hole in the carrying base 300, so the threaded fastener can press and fix the second connecting portion 130 on the carrying base 300, thereby the main portion 110 can press and fix the cable 200. During the disassembly process, unscrew the threaded fastener from the threaded hole to release the limit constraint on the second connecting part 130, and then the cable 200 can be taken out.

Figure 10:
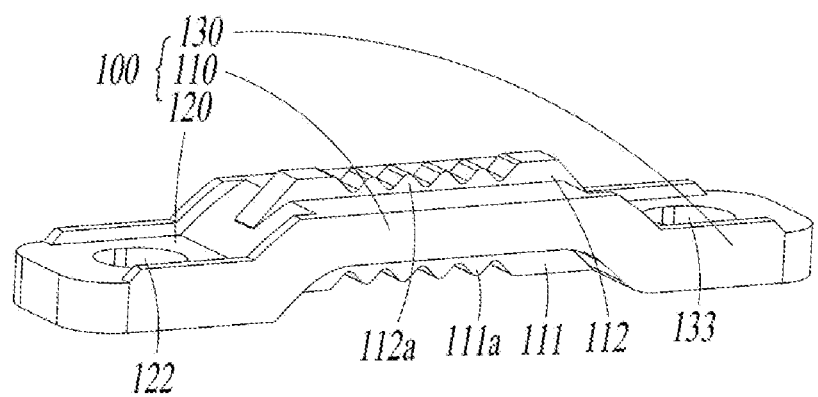
FIG. 10 is a schematic diagram of a third cable pressing structure according to examples of the present disclosure.
Figure 11:
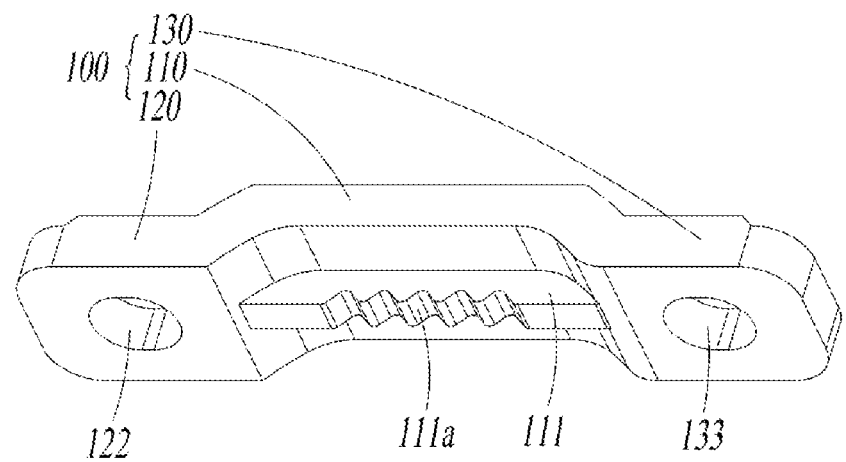
FIG. 11 is a schematic diagram of the third cable pressing structure from another perspective according to examples of the present disclosure.

Certainly, the first connecting portion 120 and the carrying base 300 may also be connected through other fitting manners besides rotational fitting. As shown in FIG. 10 and FIG. 11, the first connecting portion 120 may be provided with a third mounting hole 122, and the second connecting portion 130 may be provided with a fourth mounting hole 133. The cable pressing structure 100 can be detachably connected to the carrying base 300 through the cooperation of the third mounting hole 122 and a threaded fastener and the cooperation of the fourth mounting hole 133 and a threaded fastener.

During installation process, the threaded fasteners respectively pass through the third mounting hole 122 and the fourth mounting hole 133, and the threaded fastener is threadedly fitted with the threaded hole on the carrying base 300, so the threaded fasteners can press and fix both the first connecting portion 120 and the second connecting portion 130 on the carrying base 300, and then the main portion 110 is driven to press and fix the cable 200. During disassembly, unscrew the threaded fasteners from the threaded hole to release the limit constraint on the first connecting portion 120 and the second connecting part 130, and then the cable 200 can be taken out.

Based on cable pressing structure 100 described above, an example of the present disclosure further provides a lamp, which includes a carrying base 300 and a cable pressing structure 100. In the example, the lamp may be a linear lamp, a downlight, a candle lamp, etc. The specific type of the lamp is not limited in the example.

In the lamp according to the example, the carrying base 300 may be a lamp housing or a mounting seat provided on the housing, and the cable pressing structure 100 presses and fixes the cable 200 to the mounting seat. Furthermore, the mounting seat may be provided with a cable-passing groove 330. During installation, the cable 200 can be partially accommodated in the cable-passing groove 330. Such arrangement can not only improve the installation stability of the cable 200, but also optimize the structural layout of the lamp and improve space utilization. In the example, the mounting seat is arranged inside the housing, which makes the appearance of the lamp more concise.

The present disclosure discloses a cable pressing structure and a lamp, and a method of manufacturing a cable pressing structure.

In order to solve the above problem, the following technical solutions are adopted for the present disclosure.

On the one hand, the present disclosure provides a cable pressing structure adapted to fix a cable on a carrying base, comprising: a main portion and a first connecting portion and a second connecting portion respectively provided at both ends of the main portion, the cable pressing structure is configured to be detachably connected to the carrying base through the first connecting portion and the second connecting portion, and press and fix the cable on the carrying base.

The main portion has a first side surface and a second side surface facing away from each other, a first cable pressing portion is provided on the first side surface, and a second cable pressing portion is provided on the second side surface.

The cable pressing structure has a first installation state and a second installation state, wherein, in the first installation state, the first cable pressing portion faces the carrying base and forms a first cable pressing space with the carrying base; in the second installation state, the second cable pressing portion faces the carrying base and forms a second cable pressing space with the carrying base, a size of the first cable pressing space and a size of the second cable pressing space are not equal.

On the other hand, the present disclosure provides a lamp, comprising: a carrying base and the above-mentioned cable pressing structure.

For the lamp, the main portion may be arched, a concave surface of the main portion may be the first side surface, the first cable pressing portion may be arranged on the concave surface; a convex surface of the main portion may be the second side surface, the second cable pressing portion may be arranged on the convex surface.

For the lamp, at least a partial area of the first cable pressing portion may be provided with a first tooth, and at least a partial area of the second cable pressing portion may be provided with a second tooth.

For the lamp, the cable pressing structure may be configured to be rotatably fitted with the carrying base through the first connecting portion, and the second connecting portion may be configured to move closer to the carrying base or away from the carrying base along with rotation of the cable pressing structure.

The present disclosure provides a method of manufacturing a cable pressing structure that is adapted to fix a cable on a carrying base. The method may include providing a main portion; and providing a first connecting portion and a second connecting portion at both ends of the main portion; configuring the cable pressing structure to be detachably connected to the carrying base through the first connecting portion and the second connecting portion, and pressing and fixing the cable on the carrying base; providing the main portion with a first side surface and a second side surface facing away from each other, providing a first cable pressing portion on the first side surface, and providing a second cable pressing portion is provided on the second side surface; providing the cable pressing structure with a first installation state and a second installation state, where, in the first installation state, the first cable pressing portion may face the carrying base and may form a first cable pressing space with the carrying base; in the second installation state, the second cable pressing portion may face the carrying base and may form a second cable pressing space with the carrying base, a size of the first cable pressing space and a size of the second cable pressing space may not be equal.

The method may also include configuring the cable pressing structure to be rotatably fitted with the carrying base through the first connecting portion, and configuring the second connecting portion to move closer to the carrying base or away from the carrying base along with rotation of the cable pressing structure.

The method may include providing the first connecting portion with a first mounting hole, providing the carrying base with a supporting link, and sleeving the first connecting portion on the supporting link through the first mounting hole.

The method may also include providing one of the second connecting portion and the carrying base with a first limiting portion, and providing the other with a plurality of second limiting portions, where the first limiting portion may be capable of being snap-fitted to one of the plurality of second limiting portions, and a size of an accommodating space between the main portion and the carrying base may change as the first limiting portion may be snap-fitted to different second limiting portions among the plurality of second limiting portions.

In the cable pressing structure according to the present disclosure, the cable pressing structure can be in a first installation state, and the first cable pressing portion faces the carrying base and forms a first cable pressing space with the carrying base, in this case, a cable of one thickness specification can be pressed and fixed in the first cable pressing space. Furthermore, the cable pressing structure can also be in a second installation state, and the second cable pressing portion faces the carrying base, and forms a second cable pressing space with the carrying base. Since the sizes of the second cable pressing space and the first cable pressing space are not equal, a cable of another thickness specification can be pressed and fixed in the second cable pressing space. Therefore, the cable pressing structure according to the present disclosure can be applied to the fixing installation operation of cables of at least two thickness specifications, and it undoubtedly has better versatility.

The above-mentioned examples of the present disclosure focus on the differences between the examples, and as long as the different optimization features between the examples are not contradictory, they can be combined to form a more optimal example. For the succinct writing, the details will not be repeated herein.

The above descriptions are only the examples of the present disclosure, and are not used to limit the present disclosure. For those skilled in the art, the present disclosure can have various modifications and changes. Any modification, equivalent replacement, improvement, and the like made within the spirit and principle of the present disclosure will be included in the scope of the present disclosure.

What is claimed is:

1. A cable pressing structure, adapted to fix a cable on a carrying base, comprising:
    a main portion; and
    a first connecting portion and a second connecting portion provided at both ends of the main portion, and wherein:
    the cable pressing structure is configured to be detachably connected to the carrying base through the first connecting portion and the second connecting portion, and press and fix the cable on the carrying base;
    the main portion has a first side surface and a second side surface facing away from each other, a first cable pressing portion is provided on the first side surface, and a second cable pressing portion is provided on the second side surface; and
    the cable pressing structure has a first installation state and a second installation state, wherein, in the first installation state, the first cable pressing portion faces the carrying base and forms a first cable pressing space with the carrying base; in the second installation state, the second cable pressing portion faces the carrying base and forms a second cable pressing space with the carrying base, a size of the first cable pressing space and a size of the second cable pressing space are not equal, and
    wherein the cable pressing structure is configured to be rotatably fitted with the carrying base through the first connecting portion.

2. The cable pressing structure according to claim 1, wherein the main portion is arched, a concave surface of the main portion is the first side surface, the first cable pressing portion is arranged on the concave surface; a convex surface of the main portion is the second side surface, the second cable pressing portion is arranged on the convex surface.

3. The cable pressing structure according to claim 1, wherein at least a partial area of the first cable pressing portion is provided with a first tooth, and at least a partial area of the second cable pressing portion is provided with a second tooth.

4. The cable pressing structure according to claim 1, wherein the second connecting portion is configured to move closer to the carrying base or away from the carrying base along with rotation of the cable pressing structure.

5. The cable pressing structure according to claim 4, wherein the first connecting portion is provided with a first mounting hole, the carrying base is provided with a supporting link, and the first connecting portion is sleeved on the supporting link through the first mounting hole.

6. The cable pressing structure according to claim 4, wherein one of the second connecting portion and the carrying base is provided with a first limiting portion, and the other is provided with a plurality of second limiting portions; the first limiting portion is capable of being snap-fitted to one of the plurality of second limiting portions, and a size of an accommodating space between the main portion and the carrying base changes as the first limiting portion is snap-fitted to different second limiting portions among the plurality of second limiting portions.

7. The cable pressing structure according to claim 6, wherein the second connecting portion is provided with a plurality of snap grooves arranged along a height direction of the cable pressing structure, and a third tooth adapted to the snap grooves is provided on the carrying base, and the third tooth is capable of being snap-fitted to one of the snap grooves.

8. A lamp, comprising a carrying base, and a cable pressing structure, wherein the cable pressing structure is adapted to fix a cable on the carrying base, and the cable pressing structure comprises:
    a main portion; and
    a first connecting portion and a second connecting portion provided at both ends of the main portion, and wherein:
    the cable pressing structure is configured to be detachably connected to the carrying base through the first connecting portion and the second connecting portion, and press and fix the cable on the carrying base;
    the main portion has a first side surface and a second side surface facing away from each other, a first cable pressing portion is provided on the first side surface, and a second cable pressing portion is provided on the second side surface; and
    the cable pressing structure has a first installation state and a second installation state, wherein, in the first installation state, the first cable pressing portion faces the carrying base and forms a first cable pressing space with the carrying base; in the second installation state, the second cable pressing portion faces the carrying base and forms a second cable pressing space with the carrying base, a size of the first cable pressing space and a size of the second cable pressing space are not equal, and
    wherein the cable pressing structure is configured to be rotatably fitted with the carrying base through the first connecting portion.

9. The lamp of claim 8, wherein the main portion is arched, a concave surface of the main portion is the first side surface, the first cable pressing portion is arranged on the concave surface; a convex surface of the main portion is the second side surface, the second cable pressing portion is arranged on the convex surface.

10. The lamp of claim 8, wherein at least a partial area of the first cable pressing portion is provided with a first tooth, and at least a partial area of the second cable pressing portion is provided with a second tooth.

11. The lamp of claim 8, wherein the second connecting portion is configured to move closer to the carrying base or away from the carrying base along with rotation of the cable pressing structure.

12. A method of manufacturing a cable pressing structure that is adapted to fix a cable on a carrying base, comprising:
    providing a main portion;
    providing a first connecting portion and a second connecting portion at both ends of the main portion;
    configuring the cable pressing structure to be detachably connected to the carrying base through the first connecting portion and the second connecting portion, and pressing and fixing the cable on the carrying base;

providing the main portion with a first side surface and a second side surface facing away from each other, providing a first cable pressing portion on the first side surface, and providing a second cable pressing portion is provided on the second side surface;

providing the cable pressing structure with a first installation state and a second installation state, wherein, in the first installation state, the first cable pressing portion faces the carrying base and forms a first cable pressing space with the carrying base; in the second installation state, the second cable pressing portion faces the carrying base and forms a second cable pressing space with the carrying base, a size of the first cable pressing space and a size of the second cable pressing space are not equal, and configuring the cable pressing structure to be rotatably fitted with the carrying base through the first connecting portion.

13. The method of claim 12, further comprising: configuring the second connecting portion to move closer to the carrying base or away from the carrying base along with rotation of the cable pressing structure.

14. The method of claim 13, further comprising: providing the first connecting portion with a first mounting hole, providing the carrying base with a supporting link, and sleeving the first connecting portion on the supporting link through the first mounting hole.

15. The method of claim 13, further comprising: providing one of the second connecting portion and the carrying base with a first limiting portion, and providing the other with a plurality of second limiting portions, wherein the first limiting portion is capable of being snap-fitted to one of the plurality of second limiting portions, and a size of an accommodating space between the main portion and the carrying base changes as the first limiting portion is snap-fitted to different second limiting portions among the plurality of second limiting portions.

* * * * *